United States Patent
Jennings

(10) Patent No.: US 8,486,574 B2
(45) Date of Patent: Jul. 16, 2013

(54) METHOD AND SYSTEM FOR POWER CONTROL IN AN AUTOMOTIVE VEHICLE

(75) Inventor: Mark John Jennings, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 389 days.

(21) Appl. No.: 12/502,250

(22) Filed: Jul. 14, 2009

(65) Prior Publication Data
US 2011/0014533 A1 Jan. 20, 2011

(51) Int. Cl.
*H01M 8/04* (2006.01)
(52) U.S. Cl.
USPC .......................................... 429/430; 429/428
(58) Field of Classification Search
USPC .................................. 429/400–535
See application file for complete search history.

(56) References Cited

U.S. PATENT DOCUMENTS

| | | | |
|---|---|---|---|
| 5,631,532 A * | 5/1997 | Azuma et al. | 320/102 |
| 5,820,172 A | 10/1998 | Brigham et al. | |
| 6,555,928 B1 | 4/2003 | Mizuno et al. | |
| 6,975,091 B2 | 12/2005 | Lee et al. | |
| 2004/0018399 A1 | 1/2004 | Jung | |
| 2005/0095471 A1 | 5/2005 | Winstead | |

OTHER PUBLICATIONS

Jeong et al., Energy management strategies of a fuel cell/battery hybrid system using fuzzy logics, Jun. 2005, Journal of Power Sources, 145, pp. 319-326.*
P. Thounthong, et al. A Control Strategy of Fuel Cell/Battery Hybrid Power Source for Electric Vehicle Applications, pp. 1-7; Publication date: Jun. 18-22, 2006.
Paganelli et al.; Optimizing Control Strategy for Hybrid Fuel Cell Vehicle; SAE Technical Paper Series 2002-01-0102; Mar. 4-7, 2002; 11 pages.

* cited by examiner

*Primary Examiner* — Basia Ridley
*Assistant Examiner* — Jonathan G. Leong
(74) *Attorney, Agent, or Firm* — Damian Porcari; Brooks Kushman P.C.

(57) ABSTRACT

A method for controlling a vehicle including a fuel cell system and an energy storage unit includes, if the fuel cell system is charging the energy storage unit, determining an average ratio of (i) a change in energy stored in the energy storage unit and (ii) a mass of hydrogen consumed by the fuel cell system to generate the change in energy stored in the energy storage unit. The method also includes, if the fuel cell system is not charging the energy storage unit, selecting a target operating power for the fuel cell system based on vehicle power demand and the determined ratio that sufficiently minimizes drive cycle hydrogen consumption by the fuel cell system.

11 Claims, 4 Drawing Sheets

METHOD AND SYSTEM FOR POWER CONTROL IN AN AUTOMOTIVE VEHICLE

BACKGROUND

An automotive propulsion system may include a fuel cell system and high voltage battery pack. Either or both of the fuel cell system and high voltage battery pack may supply power to meet the power demands for the vehicle.

SUMMARY

A method for controlling a hybrid fuel cell vehicle including a fuel cell system and an energy storage unit may include determining a fuel cell system power to raise the state of energy of the energy storage unit and satisfy vehicle power demand that generally minimizes hydrogen consumption by the fuel cell system, and operating the fuel cell system to generate the determined fuel cell system power.

A hybrid fuel cell vehicle propulsion system may include an energy storage unit, a fuel cell module and a controller. The controller may be configured to, if the fuel cell system is charging the energy storage unit, determine an average ratio of (i) a change in energy stored in the energy storage unit and (ii) a mass of hydrogen consumed by the fuel cell system to generate the change in energy stored in the energy storage unit. The controller may also be configured to, if the fuel cell system is not charging the energy storage unit, select a target operating power for the fuel cell system based on vehicle power demand and the determined ratio that generally minimizes drive cycle hydrogen consumption by the fuel cell system.

A method for controlling a vehicle including a fuel cell system and an energy storage unit may include, if the fuel cell system is charging the energy storage unit, determining an average ratio of (i) a change in energy stored in the energy storage unit and (ii) a mass of hydrogen consumed by the fuel cell system to generate the change in energy stored in the energy storage unit. The method may also include, if the fuel cell system is not charging the energy storage unit, selecting a target operating power for the fuel cell system based on vehicle power demand and the determined ratio that sufficiently minimizes drive cycle hydrogen consumption by the fuel cell system.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
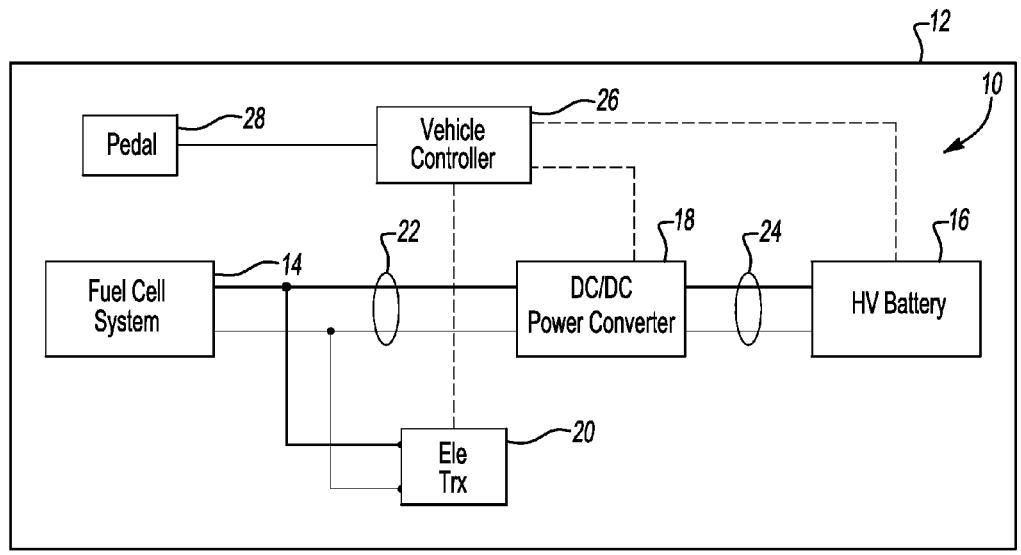
FIG. 1 is a block diagram of an embodiment of a propulsion system for an automotive vehicle.

Referring now to FIG. 1, an embodiment of a propulsion system 10 for an automotive vehicle 12 includes a fuel cell system 14 (e.g., fuel cell stack and associated controller(s)), energy storage system 16 (e.g., high voltage traction battery pack and associated controller(s)), power converter 18 (e.g., DC/DC power converter) and an electric traction drive 20. The fuel cell system 14, power converter 18 and electric traction drive 20 are electrically connected via a first electrical bus 22. The energy storage system 16 and power converter 18 are electrically connected via a second electrical bus 24.

The fuel cell system 14, energy storage system 16, power converter 18 and electric traction drive 20 are in communication with/under the control of a vehicle controller 26. As explained below, the vehicle controller 26 may include one or more control modules configured to receive requests for power from a driver (via, for example, an accelerator pedal 28) and/or determine operating parameters of/issue operating commands to any/all of the fuel cell system 14, energy storage system 16, power converter 18 and electric traction drive 20. Of course, other suitable propulsion arrangements are also possible.

As apparent to those of ordinary skill, electrical power from the fuel cell system 14 and/or energy storage system 16 may be used (i) to generate motive power for the vehicle 12 via the electric traction drive 20 and/or (ii) supply power to any accessory loads. Because power may be drawn from either/both of the fuel cell system 14 and energy storage system 16, certain strategies may generally minimize the amount of fuel (e.g., hydrogen) consumed by the fuel cell system 14 while still meeting the requested power demands.

Figure 2:
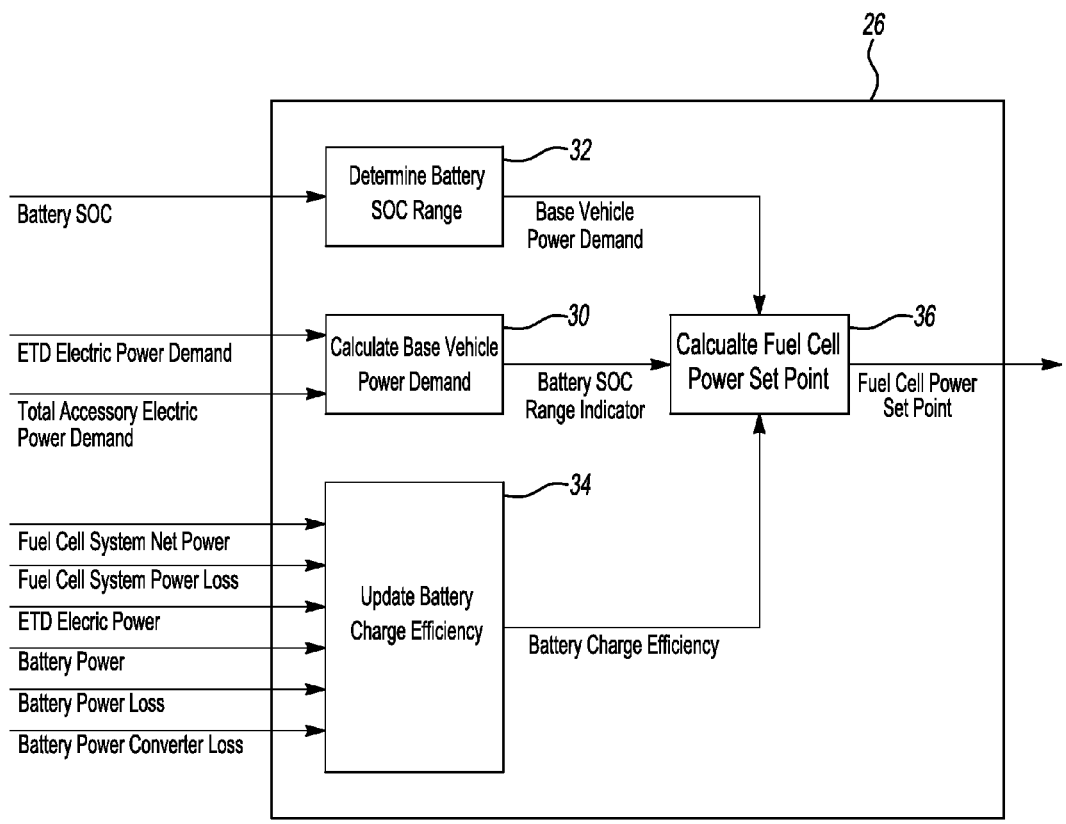
FIG. 2 is a block diagram of an embodiment of the vehicle controller of FIG. 1.

Referring now to FIGS. 1 and 2, the controller 26 may receive several inputs defined as follows:

Battery State of Charge (SOC)—Battery state of charge provided by battery subsystem control.

Electric traction drive electric power demand—Electrical power demand of the electric traction drive 20 as determined from driver power demand.

Total accessory electric power demand—Total electrical power consumed by vehicle auxiliary loads.

Fuel cell system net power—Net power currently being delivered by the fuel cell system 14 to the vehicle bus 22.

Fuel cell system power loss—Total power loss within the fuel cell system 14 from fuel in to net power out. (In certain embodiments, the power losses include parasitic loads within the fuel cell system 14, e.g., compressor, hydrogen recirculation blower, etc.)

Electric traction drive electric power—Actual electrical power currently being consumed or generated by the electric traction drive 20.

Battery power—Actual charge or discharge battery power flowing into or out of the battery pack 16 at its terminals.

Battery power loss—Battery internal power loss associated with the instantaneous level of charge or discharge power to/from the battery 16.

Battery power converter loss—Battery power converter loss associated with the instantaneous level of charge/discharge power to/from the battery 16.

These inputs may be fed into one or more control functions (discussed below) within the controller 26. In the embodiment of FIG. 2, there are four main functions 30, 32, 34, 36 (described below). The functions 30, 32, 34 calculate signals that feed the function 36. In other embodiments, any suitable control logic scheme may be used.

The function 36 provides an output defined as follows:

Fuel cell power set point—The fuel cell system net power command to be sent to the fuel cell system control. The command corresponds to the power level that the fuel cell system 14 must deliver to meet instantaneous vehicle power demand at a generally minimum fuel cost (sufficiently minimum use of hydrogen fuel mass) or a generally best system fuel efficiency.

Calculate Base Vehicle Power Demand 30

This function calculates a base vehicle electrical power demand, $Pw_{VehDmdBase}$, from the sum of electric traction drive electric power demand, $Pw_{ETDDmd}$ and accessory electric power demand, $Pw_{AuxDmd}$:

$$Pw_{VehDmdBase} = Pw_{ETDDmd} + Pw_{AuxDmd} \quad (1)$$

The output of this function is $Pw_{VehDmdBase}$, which is fed to the Calculate Fuel Cell Power Set Point function 36.

Determine Battery SOC Range 32

This function determines the SOC range within which the battery 16 is currently operating. The SOC range identifier is used to trigger the logic for calculating the fuel cell system net power command. Three SOC range identifiers are used in the embodiment of FIG. 2 (other embodiments, of course, may include a greater or fewer number of range identifiers):

Normal—This is the desired target operating range for the battery 16. When the battery SOC is in this range, it is properly conditioned to deliver power to assist the fuel cell system 14 in meeting vehicle power demand.

Low—This range indicates that the battery SOC is below the target operating range of the battery 16. When in this state, the battery 16 requires charging to move it back into the desired or normal operating range.

Very Low—This range indicates that the battery 16 is in an extremely low state of charge that requires high power, rapid charging in order to move the SOC towards its desired operating range as quickly as possible.

Figure 3:
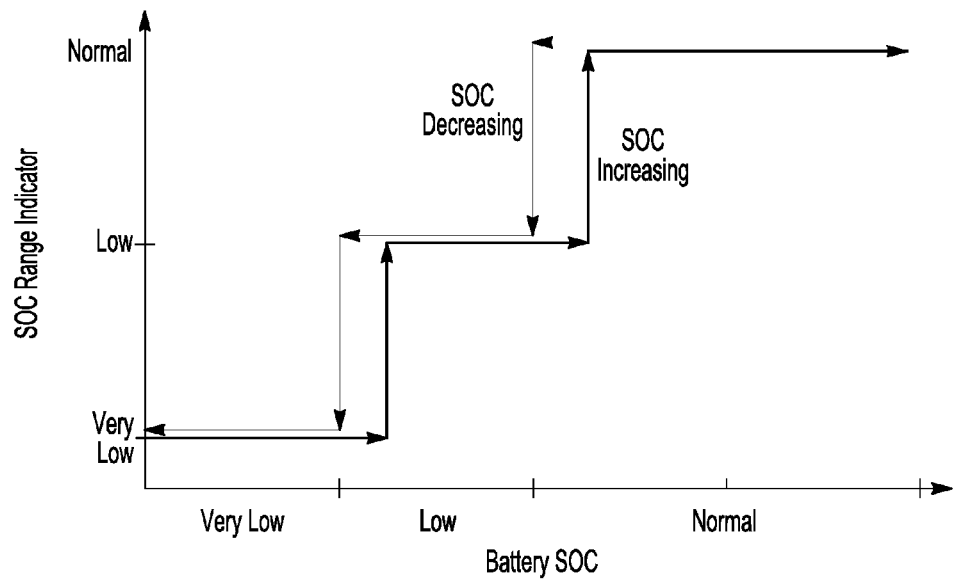
FIG. 3 is an example plot of battery state of charge range indicator versus battery state of charge.

Referring now to FIGS. 1 and 3, the controller 26 may determine the SOC range indicator based on the battery SOC. The logic depicted in FIG. 3 includes hysteresis in order to avoid undesirable oscillation when range boundaries are crossed. When the battery SOC increases from the Very Low to the Low range, the high charging table will continue to be used until a "high charging off" threshold is crossed. Likewise, when the battery SOC increases from the Low to the Normal range, the marginal charging table will continue to be used until a "marginal charging off" threshold is crossed. These crossover thresholds may be lower when the SOC is decreasing.

The "high charging off" and "marginal charging off" thresholds are calibration parameters, as are the SOC values that define the SOC ranges given above.

Calculate Fuel Cell System Power Set Point 36

This function calculates the fuel cell system net power command. There may be three main branches to the logic, which are triggered depending on the battery SOC. The main branches correspond to the different SOC ranges defined previously. The calculation of fuel cell system power set point for each range is explained in the following:

SOC Very Low—When the battery SOC is in the "Very Low" range, the battery 16 is in an extremely low state of charge that requires high power, rapid charging in order to move the SOC towards its desired operating range as quickly as possible. The first logic step in this branch is to calculate the battery charge power that must be provided by the fuel cell system 14. This may be determined from a high charging table look up that will depend on the battery SOC:

$$Pw_{ReqBattChg} = f_{HighBattChg}(SOC) \quad (2)$$

Here, $Pw_{ReqdBattChg}$ is the required battery charge power and $f_{HighBattChg}$ is the SOC dependent, high charge power table. This table may be calibrated manually and may be tuned to best fit actual vehicle and battery behavior. In some embodiments, it is assumed that high charging will only be required under extreme circumstances.

Once the required battery charge power is determined, the fuel cell system net power command, $Pw_{FCSCmd}$, may be given by:

$$Pw_{FCSCmd} = Pw_{VehDmdBase} + Pw_{ReqdBattChg} \quad (3)$$

SOC Low—This range indicates that the battery SOC is below the target operating range of the battery 16. When in this state, the battery 16 requires charging to move it back into the target operating range. When the battery SOC falls into the "Low" range, the required battery charge power may be determined from a marginal charging table look up that depends on the Base Vehicle Power Demand, $Pw_{VehDmdBase}$:

$$Pw_{ReqdBattChg} = f_{MargBattChg}(Pw_{VehDmdBase}) \quad (4)$$

Here, $Pw_{ReqdBattChg}$ is the required battery charge power and $f_{MargBattChg}$ is the marginal charging map. The map $f_{MargBattChg}$ may be calibrated to give the charge power that will produce the overall best charge efficiency (i.e., sufficiently minimum hydrogen fuel mass used per unit of charge power) for the given base vehicle power demand. An example method for determining this map is presented below.

Following determination of the required battery charge power, the fuel cell system net power command may be calculated from:

$$Pw_{FCSCmd} = Pw_{VehDmdBase} + Pw_{ReqdBattChg} \quad (5)$$

SOC Normal—This range indicates that the battery SOC is within or above the desired target operating range for the battery. When the battery SOC is in this range, it is properly conditioned to deliver power to assist the fuel cell system 14 in meeting vehicle power demand. The fuel cell system net power command may be determined from:

$$Pw_{FCSCmd} = f_{FCSPwFrac}(Pw_{VehDmdBase}, \eta_{BattChg}) \times Pw_{VehDmdBase} \quad (6)$$

Here, $f_{FCSPwFrac}$ is a fuel cell system power fraction map that depends on the vehicle power demand and the averaged battery charge efficiency $\eta_{BattChg}$. The value produced by the map is a dimensionless number between 0 and 1 that represents the fraction of vehicle power demand the fuel cell system 14 must deliver to meet the power demand with best system efficiency or a generally minimum required hydrogen fuel mass. If this fraction is less than 1, it is assumed that the remaining power will be provided by the battery 16.

The map, $f_{FCSPwFrac}$, may be generated from fuel cell system 14, battery 16 and power converter 18 efficiency data. An example method for doing this is outlined below.

The battery charge efficiency, $\eta_{BattChg}$, is a cumulative average of the fuel to battery energy efficiency associated with the charging events during vehicle driving. This represents an equivalent mass of hydrogen per unit of energy stored in the battery. This average is updated and maintained by the function Update Battery Charge Efficiency 34.

Update Battery Charge Efficiency 34

This function tracks a cumulative, energy-averaged efficiency that represents the mass of hydrogen associated with energy stored in the battery 16 from charge events that occur during driving.

Figure 4:
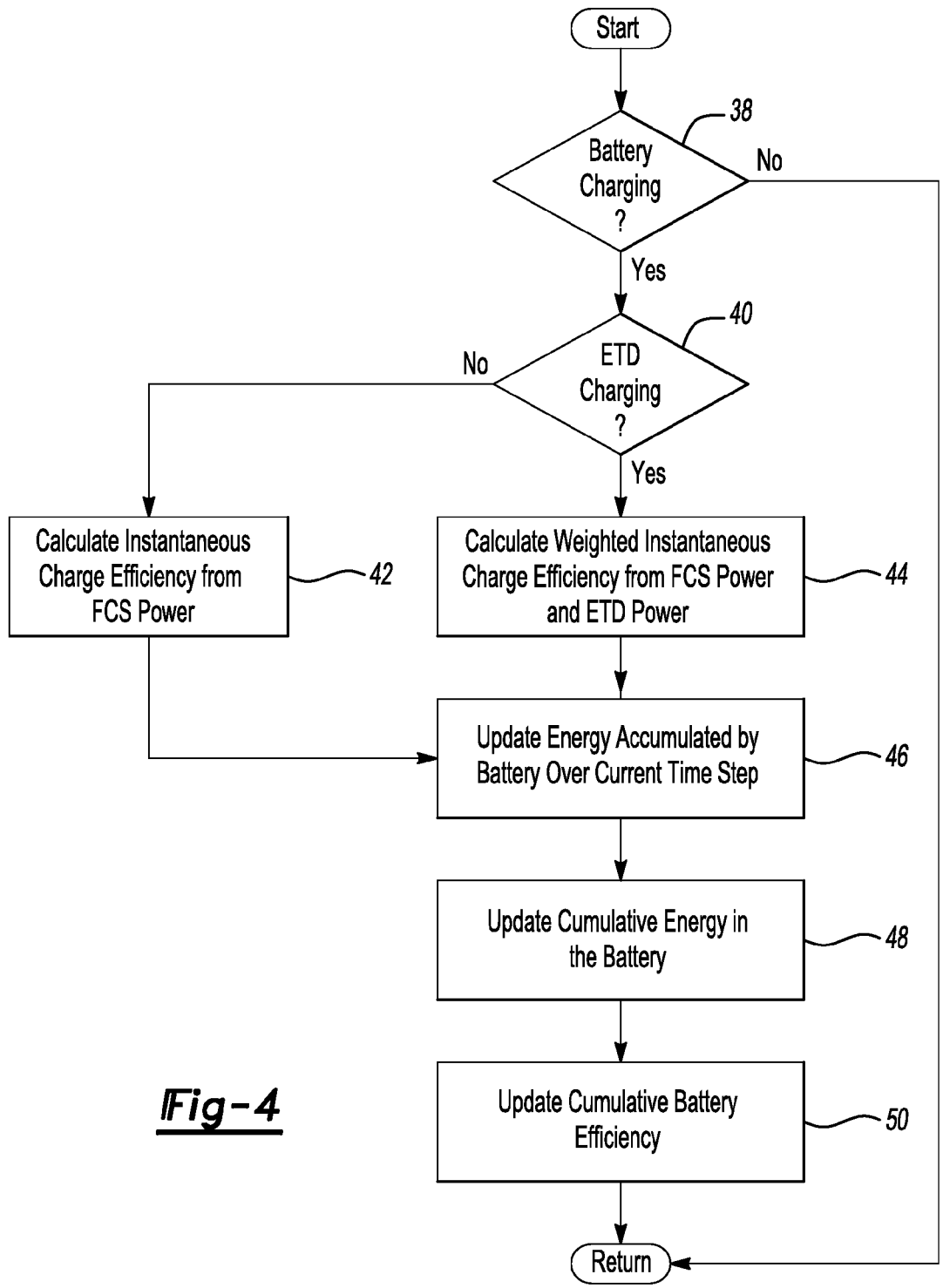
FIG. 4 is a flow chart depicting an example strategy for updating battery charge efficiency.

Referring now to FIGS. 1 and 4, the sign of the sensed battery power is checked to determine if battery charging is occurring as indicated at 38. If the sign of the power indicates battery discharge, no update to the charge efficiency is necessary.

As indicated at 40, the sign of the electric traction drive electrical power is checked to determine if it is providing charge power to the vehicle bus 22. If the electric traction drive is not providing charge power to the vehicle bus 22, the strategy proceeds to 42. Otherwise, the strategy proceeds to 44.

As indicated at 42, the battery charge efficiency, $\eta_{BattChg,\Delta t}$, is calculated for the current control time step as:

$$\eta_{BattChg,\Delta t} = \frac{Pw_{FCS}}{Pw_{FCS} + Pw_{FCSTotLoss}} \times \frac{Pw_{Batt} - Pw_{BattLoss}}{Pw_{Batt} + Pw_{BattPwCnvrtrLoss}} \quad (7)$$

Here, $Pw_{FCSTotLoss}$ is the total power loss across the fuel cell system 14 from fuel in to net electrical power out, $Pw_{Batt}$ is the battery electrical power at the battery terminals, $Pw_{BattPwCnvrtrLoss}$ is the power loss across the battery power converter and $Pw_{BattLoss}$ is the battery internal power loss from the terminals to the internal chemical energy storage. The denominator in the first term of Equation 7 is directly proportional to the hydrogen fuel mass consumed and the numerator of the second term is directly proportional to energy stored in the battery over the control time step. Therefore, Equation 7 represents a ratio between energy stored in the battery and hydrogen mass associated with that energy.

As indicated at 44, the battery charge efficiency for the current control time step, $\eta_{BattChg,\Delta t}$, may be calculated according to the following:

a. Calculate the battery charge efficiency from fuel cell system power as:

$$\eta_{FCSBattChg,\Delta t} = \frac{Pw_{FCS}}{Pw_{FCS} + Pw_{FCSTotLoss}} \times \frac{Pw_{Batt} - Pw_{BattLoss}}{Pw_{Batt} + Pw_{BattPwCnvrtrLoss}} \quad (8)$$

b. Calculate the net battery charge efficiency for the current control time step, $\eta_{BattChg,\Delta t}$, as:

$$\eta_{BattChg,\Delta t} = \frac{\max((Pw_{FCS} - Pw_{AuxDmd}), 0)}{Pw_{Batt} + Pw_{Batt}Pw_{CnvrtrLoss}} \eta_{FCSBattChg,\Delta t} + \frac{Pw_{ETD} - \max((Pw_{AuxDmd} - Pw_{FCS}), 0)}{Pw_{Batt} + Pw_{Batt}Pw_{CnvrtrLoss}} \eta_{ETDBattChg} \quad (9)$$

Equation 8 is identical to Equation 7 and represents the ratio between energy stored in the battery and hydrogen mass associated with that energy over the control time step. In Equation 9, $Pw_{ETD}$ is the total electrical power generated by the electric traction drive 20 and $\eta_{ETDBattChg}$ is a prescribed electric traction drive to battery charge efficiency that is a calibration parameter for the control.

As indicated at 46, the energy accumulated in the battery 16 over the current control time step, $\Delta E_{BattChg,\Delta t}$, may be calculated as:

$$\Delta E_{BattChg,\Delta t} = (Pw_{Batt} - Pw_{BattLoss}) \times \Delta t_{Ctrl} \quad (10)$$

Here, $\Delta t_{Ctrl}$ is the control time step size.

As indicated at 48, the cumulative energy captured in the battery 16 is updated using the equation:

$$E_{BattChg,t+\Delta t} = E_{BattChg,t} + \Delta E_{BattChg,\Delta t} \quad (11)$$

Here, $E_{BattChg,t+\Delta t}$ is the cumulative battery charge energy at control time $t+\Delta t$ and $E_{BattChg,t}$ is the cumulative battery charge energy at time t.

As indicated at 50, the cumulative battery charge efficiency may be updated using, for example, the equation:

$$\eta_{BattChg,t+\Delta t} = \frac{E_{BattChg,t}}{E_{BattChg,t+\Delta t}} \times \eta_{BattChg,t} + \frac{\Delta E_{BattChg,\Delta t}}{E_{BattChg,t+\Delta t}} \times \eta_{BattChg,\Delta t} \quad (12)$$

Here, $\eta_{BattChg,t-\Delta t}$ is the cumulative, i.e., averaged, battery charge efficiency at control time $t+\Delta t$ and $\eta_{BattChg,t}$ is the cumulative battery charge efficiency at time t. The cumulative battery charge efficiency at time t represents the ratio of energy stored in the battery to hydrogen fuel mass associated with that energy.

Fuel Cell System Power Fraction Map

In certain embodiments, the Fuel Cell System Power Fraction (FCSPF) map may be used to determine the fraction of vehicle power demand the fuel cell system 14 must deliver for best system efficiency. The main inputs to the map are vehicle power demand and battery charge efficiency. The map can easily be extended to include other dimensions, e.g., temperature. Vehicle power demand and battery charge efficiency may be the minimum dimensions. (The description here only includes these in order to simplify the explanation of the methodology for generating the map.)

The map may be generated offline using the following component data:

Fuel cell system net efficiency as a function of fuel cell system net power;

Battery power converter efficiency as a function of battery discharge power; and Battery efficiency as a function of battery discharge power.

For a given vehicle power demand, $Pw_{VehDmd}$, and battery charge efficiency, $\eta_{BattChg}$, the battery discharge power may be set to incremental values ranging from 0 to $Pw_{VehDmd}$:

$$0 \leq Pw_{BattDschg,i} \leq Pw_{VehDmd} \quad (13)$$

Here, $Pw_{BattDschg,i}$ represents the $i^{th}$ value of the battery discharge power in the given range. The corresponding fuel cell system power, $Pw_{FCS,i}$, required to satisfy vehicle power demand may be given by:

$$Pw_{FCS,i} = Pw_{VehDmd} - Pw_{BattDschg,i} \quad (14)$$

The total fuel power, $Pw_{fuel,i}$, or hydrogen fuel mass associated with the combination of fuel cell system and battery power may be given by:

$$Pw_{Fuel,i} = \frac{Pw_{FCS,i}}{\eta_{FCS}(Pw_{FCS,i})} + \frac{Pw_{BattDschg,i}}{\eta_{BattChg}\eta_{BattPwCnvrtr}(Pw_{BattDschg,i})\eta_{BattDschg}(Pw_{BattDschg,i})} \quad (15)$$

Here, $\eta_{FCS}(Pw_{FCS,i})$ is the fuel cell system efficiency evaluated at the fuel cell system power $Pw_{FCS,i}$, $\eta_{BattPwCnvrtr}(Pw_{BattDschg,i})$ is the battery power converter efficiency evaluated at the battery discharge power $Pw_{BattDschg,i}$, and $\eta_{BattDschg}(Pw_{BattDschg,i})$ is the battery efficiency evaluated at the battery discharge power $Pw_{BattDschg,i}$. Also, $\eta_{BattChg}$ is the battery charge efficiency.

Figure 5:
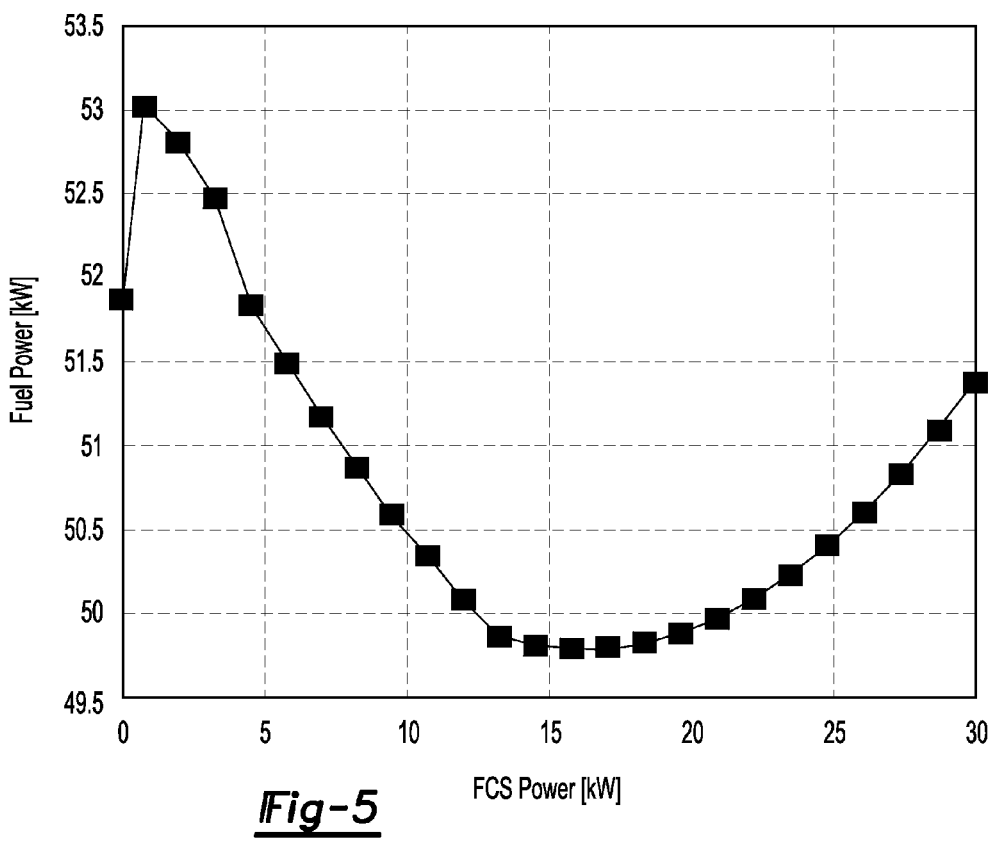
FIG. 5 is an example plot of fuel power versus fuel cell system power at a vehicle power demand of 30 kW and battery charge efficiency of 60%.

Equation (15) can be evaluated for each combination of $Pw_{FCS,i}$ and $Pw_{BattDschg,i}$ determined by Equations (13) and (14). An example of this calculation is shown in FIG. 5. The fuel cell system power that produces the minimum value of $Pw_{fuel,i}$ (i.e., the minimum hydrogen fuel mass consumed) may be selected as the optimum fuel cell system power set point for the given vehicle power demand and battery charge efficiency. The optimal value may be normalized by vehicle power demand to produce a fuel cell system power fraction value for the fuel cell system power fraction map.

Figure 6:
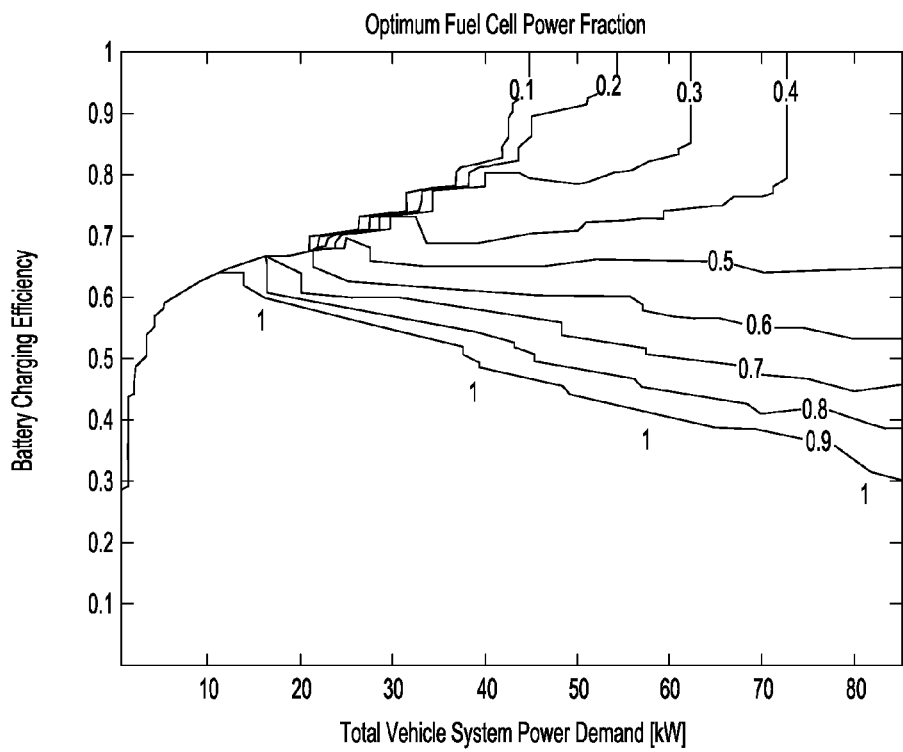
FIG. 6 is an example plot of optimum fuel cell power fraction versus total system power demand and fuel energy to battery charge energy efficiency.

The complete map may be generated by sweeping vehicle power demand from fuel cell system minimum net power to fuel cell system maximum net power. Also, battery charge efficiency may be swept from 0 to 1. An example of the resulting map is shown in FIG. 6. The contours represent optimal fuel cell power fractions for minimum fuel cost (i.e., sufficiently minimum hydrogen fuel mass consumed). It can be seen that at low battery charge efficiency (low ratio of battery energy to hydrogen fuel mass), the map will dictate that all power should come from the fuel cell system 14. At high battery charge efficiency (high ratio of battery energy to hydrogen fuel mass), the map will dictate that all power should come from the battery 16 up to its discharge power limit.

Marginal Charging Map

The Marginal Charging Map may be used to determine the optimal battery charge power when the battery SOC falls below its desired operating range. Here, the optimal battery charge power is the one that produces overall best charge efficiency from fuel in to battery chemical energy storage for a given base vehicle power demand (ETD and auxiliary load demand). This power is also the one that generally minimizes the consumption of hydrogen fuel mass per unit of energy in the battery 16. The main input to the map is base vehicle power demand. The map can easily be extended to include other dimensions, e.g., temperature. Vehicle power demand may be the minimum dimension. (The description here only includes this dimension in order to simplify the explanation of the methodology for generating the map.)

Similar to the Fuel Cell System Power Fraction, the Marginal Charging Map may be generated offline using the following component data:
Fuel cell system net efficiency as a function of fuel cell system net power;
Battery power converter efficiency as a function of battery charge power; and
Battery efficiency as a function of battery charge power.

For a given vehicle power demand, $Pw_{VehDmd}$, battery charge power may be swept from 0 to the battery charge power limit, $Pw_{BattChgLimit}$:

$$0 \leq Pw_{BattChg,i} \leq Pw_{BattChgLimit} \quad (16)$$

Here, $Pw_{BattChg,i}$ represents the $i^{th}$ value of battery charge power in the given range. The corresponding fuel cell system power, $Pw_{FCS,i}$, required to satisfy total vehicle power demand (base plus charge power) may be given by:

$$Pw_{FCS,i} = Pw_{VehDmd} + Pw_{BattChg,i} \quad (17)$$

The overall efficiency of the battery charge process, $\eta_{BattChg,i}$, is given by:

$$\eta_{BattChg,i} = \eta_{FCS}(Pw_{FCS,i}) \eta_{BattPwCnvrtr}(Pw_{BattChg,i}) \eta_{BattChg}(Pw_{BattChg,i}) \quad (18)$$

Here, $\eta_{FCS}(Pw_{FCS,i})$ is the fuel cell system efficiency evaluated at the fuel cell system power $Pw_{FCS,i}$, $\eta_{BattPwCnvrtr}(Pw_{BattChg,i})$ is the battery power converter efficiency evaluated at the battery charge power $Pw_{BattChg,i}$, and $\eta_{BattChg}(Pw_{BattChg,i})$ is the battery efficiency evaluated at the battery charge power $Pw_{BattChg,i}$. The efficiency $\eta_{BattChg,i}$ is proportional to the ratio of battery energy to hydrogen fuel mass associated with that energy.

Figure 7:
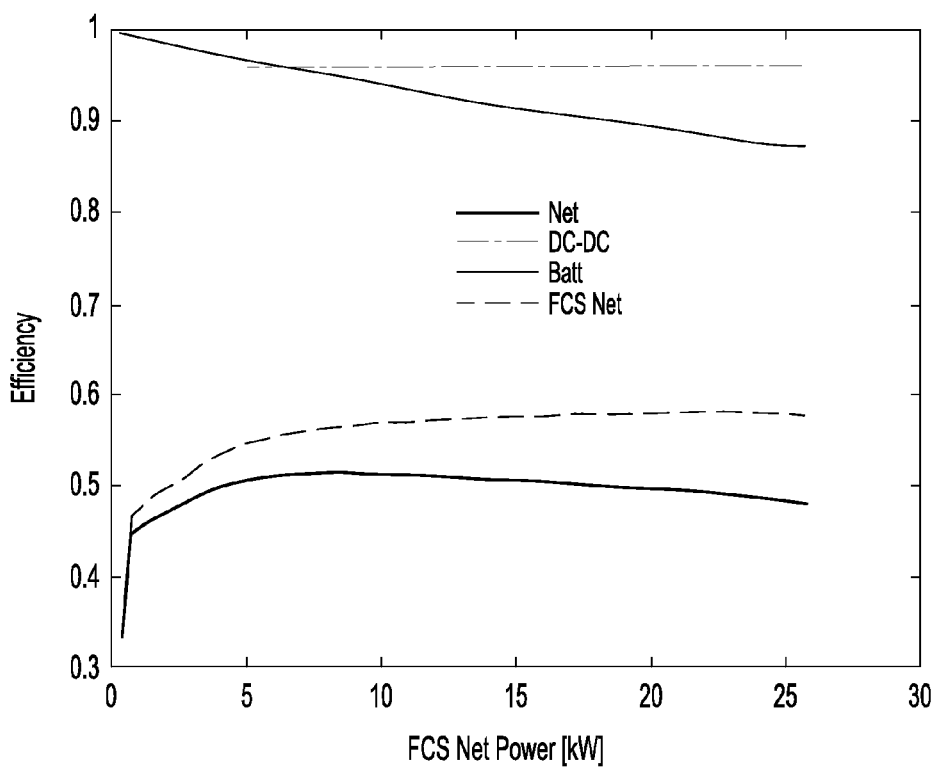
FIG. 7 is an example plot of net charge efficiency versus fuel cell system net power at an auxiliary load of 500 W.

Equation (18) can be evaluated for each combination of $Pw_{FCS,i}$ and $Pw_{BattChg,i}$ determined by Equations (16) and (17). An example of this calculation is shown in FIG. 7. The battery charge power that maximizes charge efficiency may be selected as the optimum battery charge power for the given vehicle power demand. This is the power that generally minimizes the consumption of hydrogen fuel mass per unit of energy in the battery.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed:

1. A hybrid fuel cell vehicle propulsion system comprising:
   an energy storage unit;
   a fuel cell module; and
   a controller programmed to,
      if the fuel cell system is charging the energy storage unit during a first period of time, periodically determine an average ratio of (i) a change in energy stored in the energy storage unit and (ii) a mass of hydrogen consumed by the fuel cell system to generate the change in energy stored in the energy storage unit, and
      if the fuel cell system is not charging the energy storage unit during a subsequent period of time, select a target operating power for the fuel cell system based on vehicle power demand and the average ratio that generally minimizes drive cycle hydrogen consumption by the fuel cell system.

2. The system of claim 1 wherein the energy storage unit comprises a traction battery.

3. The system of claim 1 wherein the controller is further configured to, if the fuel cell system is charging the energy storage unit and the state of energy of the energy storage unit is less than a minimum threshold, select a target operating power for the fuel cell system that generally maximizes the charge power output by the fuel cell system.

4. The system of claim 1 wherein the controller is further configured to determine whether energy from the energy storage unit can be used to supply the vehicle power demand.

5. The system of claim 1 wherein the controller is further configured to determine whether the state of energy of the energy storage unit is less than a desired threshold.

6. The system of claim 1 wherein the controller is further configured to determine whether the state of energy of the energy storage unit is greater than or equal to a desired threshold.

7. A method for controlling a vehicle including a fuel cell system and an energy storage unit, the method comprising:
   if the fuel cell system is charging the energy storage unit during a first period of time, periodically determining an average ratio of (i) a change in energy stored in the energy storage unit and (ii) a mass of hydrogen consumed by the fuel cell system to generate the change in energy stored in the energy storage unit; and if the fuel cell system is not charging the energy storage unit during a subsequent period of time, selecting a target operating power for the fuel cell system based on vehicle power demand and the determined ratio that generally minimizes drive cycle hydrogen consumption by the fuel cell system.

8. The method of claim 7 further comprising if the fuel cell system is charging the energy storage unit and the state of energy of the energy storage unit is less than a minimum threshold, selecting a target operating power for the fuel cell system that sufficiently maximizes the charge power output by the fuel cell system.

9. The method of claim 7 further comprising determining whether energy from the energy storage unit can be used to supply the vehicle power demand.

10. The method of claim 7 further comprising determining whether the state of energy of the energy storage unit is less than a desired threshold.

11. The method of claim 7 further comprising determining whether the state of energy of the energy storage unit is greater than or equal to a desired threshold.

* * * * *